No. 775,901. PATENTED NOV. 22, 1904.
J. C. W. GRETH.
WATER PURIFYING APPARATUS.
APPLICATION FILED FEB. 12, 1904.
NO MODEL. 3 SHEETS—SHEET 1.

Witnesses:
Chas. H. Ebert
Hermann Lechmers

Inventor,
John C. W. Greth
per Paul Synnestvedt
Attorney.

No. 775,901. PATENTED NOV. 22, 1904.
J. C. W. GRETH.
WATER PURIFYING APPARATUS.
APPLICATION FILED FEB. 12, 1904.
NO MODEL. 3 SHEETS—SHEET 2.
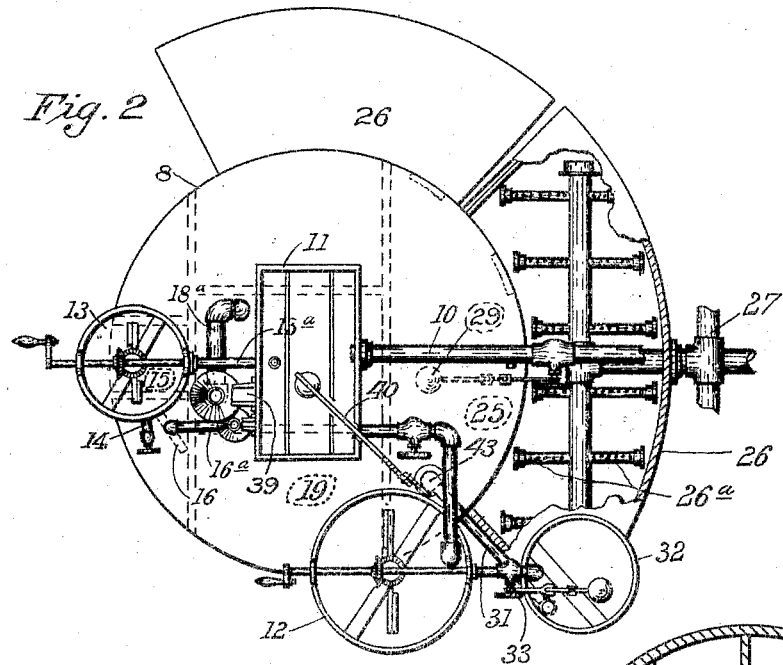
Fig. 2.
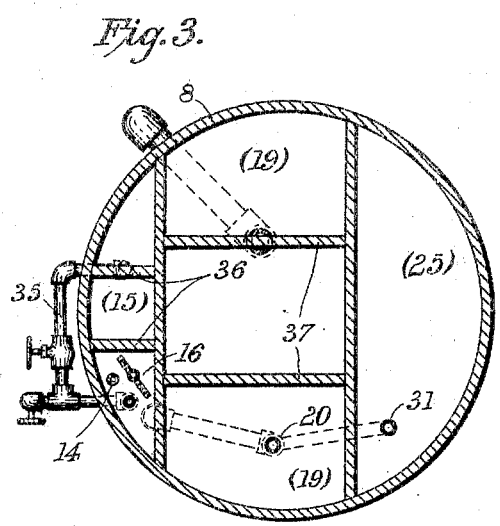
Fig. 3.
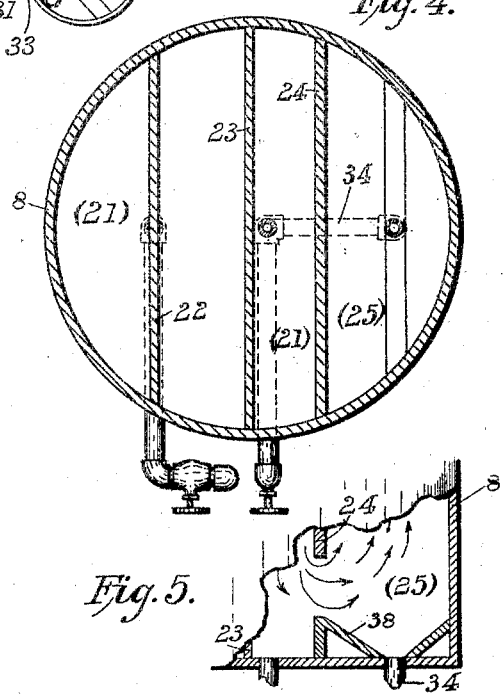
Fig. 4.
Fig. 5.
Witnesses:
Chas. H. Ebert
Hermann Lehman
Inventor,
John C. W. Greth
per Paul Synnestvedt
Attorney No. 775,901.

Patented November 22, 1904.

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

SPECIFICATION forming part of Letters Patent No. 775,901, dated November 22, 1904.

Application filed February 12, 1904. Serial No. 193,262. (No model.)

*To all whom it may concern:*

Be it known that I, JOHN C. W. GRETH, a citizen of the United States, residing at Pittsburg, in the State of Pennsylvania, have invented certain new and useful Improvements in Water-Purifying Apparatus, of which the following is a specification.

My invention relates to water purification by means of chemicals, and the treatment of waters such as hard water which requires softening by removing certain elements such as bi-carbonates and certain impurities to be precipitated preparatory to filtering the same, the invention being particularly designed to provide a compact and efficient means for mixing a softening chemical such as milk of lime and then treating with a chemical such as soda for precipitation of the impurities and settling the water and then filtering the same, all in a continuous flow system. The objects of the invention are, to provide a convenient apparatus for continuous treatment of water for softening, and precipitating impurities before filtration; to provide a superior form of vessels for thoroughly mixing milk of lime with water, and for mixing such chemicals as soda with the water after lime treatment; to regulate the soda treatment; to provide a compact and convenient apparatus in which the operations are continuous and rendered more efficient, and to generally improve the structure and operation of water purifying apparatus. These objects, and other advantages which will hereinafter appear, I attain by means of the apparatus illustrated in preferred form in the accompanying drawings, wherein—

Figure 2 is a top plan view of the apparatus with parts broken away;

Figures 3 and 4 are horizontal sections through the main tank taken respectively on lines (3) and (4) in Figure 1;

Figure 5 is a detail partial section showing a modification of the form of the settling tank;

Figure 1:
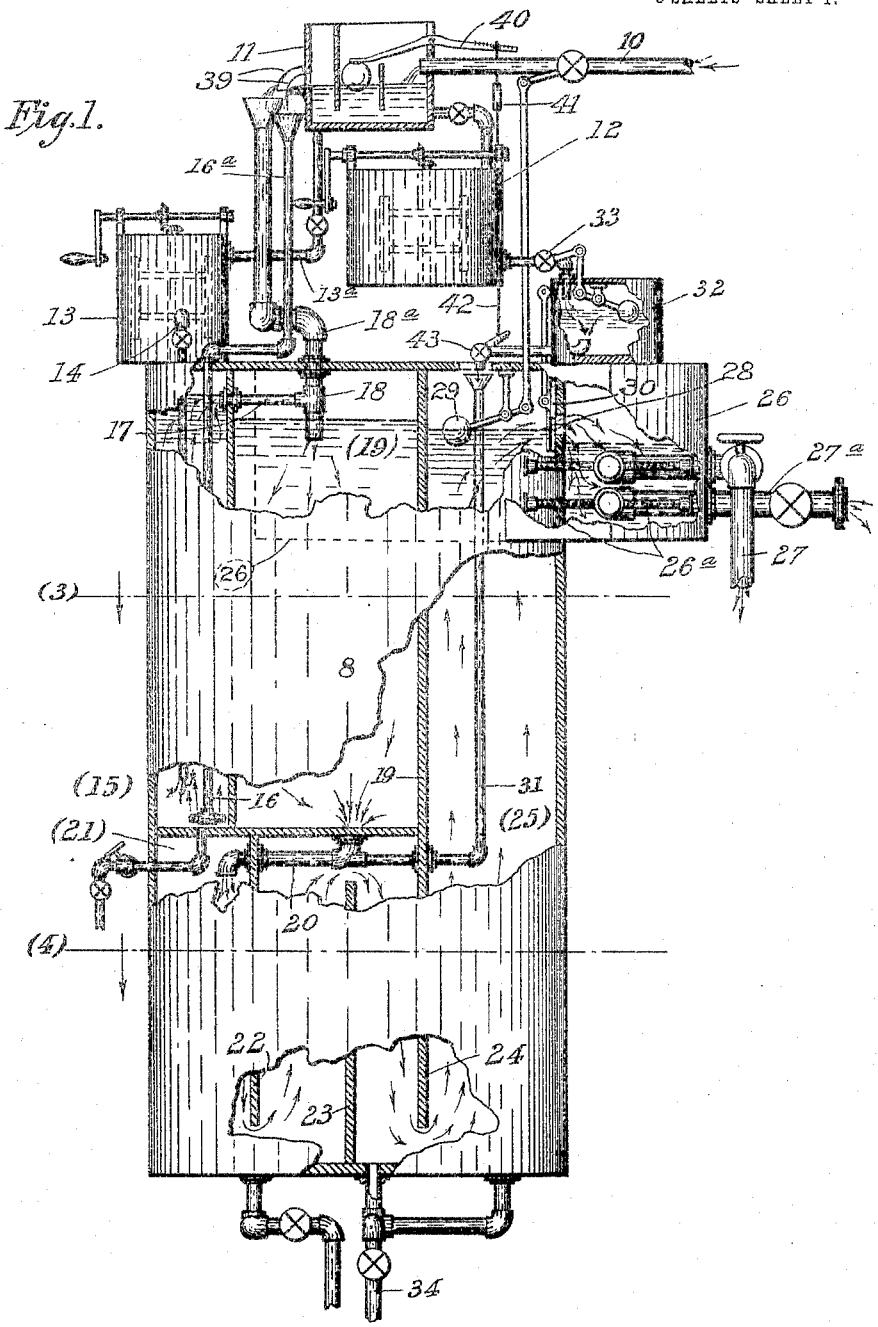
Figure 1 is a partial side elevation and partial vertical section, of the entire apparatus.

One of the primary objects of the invention being to thoroughly mix the milk of lime with hard water before treating it to the soda solution, I preferably arrange the tank as shown in Figure 1, wherein it will be seen that the large vessel 8 contains the chamber 19 for the mixing of lime hydrate, and the chamber 21 for the mixing of the soda solution. The entire system may be fed through the feed pipe 10 which empties into weir box 11 for supplying water to the several tanks and to the soda mixing vessel 12 and to the lime mixing vessel 13. The latter is fed by the pipe 13$^a$ and is provided with some stirring means therein by which lime may be slaked to a proper consistency of cream of lime, when the same is discharged downward by the pipe 14, which opens near the bottom of the compartment 15. Below the mouth of this inlet pipe is the distributer of the pipe 16 which feeds fresh water from the weir box 11 through the pipe 16$^a$, whereupon the water will rise through the cream of lime previously introduced from tank 13 and as will be seen from Figure 3 it passes first upward over one, then under one, of the other partitions 36 and thence flows out at the top through the pipe 17 into the inlet 18 which is fed with water directly from the weir box 11 through the weir 39 and the pipe 18$^a$. The saturating tank 15 is covered in my co-pending application No. 178,085.

The pipe 18 dips beneath the surface of the water in compartment 19 so that the air is excluded and the milk of lime is immediately intermingled with the hard water flowing therein; whereupon the current is set up first in a downward direction under one of the partitions 37 and then over the other partition 37, as shown in Figure 3, and discharged through the outlet pipe 20, entering into one of the compartments of the chamber 21. The water when arriving at this point is thoroughly mixed with the lime hydrate, which will cause the precipitation of such impurities as carbonates and compounds of carbon dioxid, and is here mixed with water directly from the soda box 32 by means of the pipe 31 as will be seen in Figure 1. The tank 32 is kept at a constant level by means of the float valve and cock 33, being fed with a mixture of soda which is prepared in the box 12 in a similar manner to the lime slaking box 13. The discharge from box 32 is through a valve 43 into pipe 31. This valve is automatically operated by the link 42 and lever 40 attached to the float in the weir box. The link is adjustable in length by turnbuckle 41, and its attachments to lever 40 and the handle of valve 43 are also adjustable thereon as shown. The water in the compartment 21 passes first under partition 22 and over partition 23 and finally under partition 24 into the settling tank 25, and the bottoms of all the compartments have drain pipes for carrying off the sludge and detritus as will appear from Figure 1.

The tank 25 is made very deep and the water flows upward therethrough and overflows from the edge of the wall or through slits 28 into one or more of the filters 26; the openings 28 are governed by gate valves 30, so that the communication may be closed, cutting out the flow where desired. The filter compartments 26 are preferably attached to the side of the tank 8 as shown, and each contains a mechanical gravity filter, provided with a system of piping 26$^a$ therein, so arranged that the flow of water may be sent from the supply pipe directly through the filter bed in inverse direction in order to clean out the same. This is effected by closing the gate 30 and sending the current through pipe 27$^a$ and discharging through pipe 27, while in the ordinary operation of the apparatus the flow is through the filter bed and out through the pipe 27$^a$ as will be clearly understood. One filter may be used while another is being cleaned, and the closing of gates 30 stops the flow by raising the level in 25 and prevents contamination from the filters.

In Figure 5 I have shown a slight modification of the settling tank 25 in which it will be seen that the bottom is formed with sloping sides 38 and the opening under the partition 24 is slightly elevated so that there is an easy egress of the mud and detritus through the pipe 34 and the current of water flowing under the partition 24 will not disturb the same in its upward flow.

Figure 6:
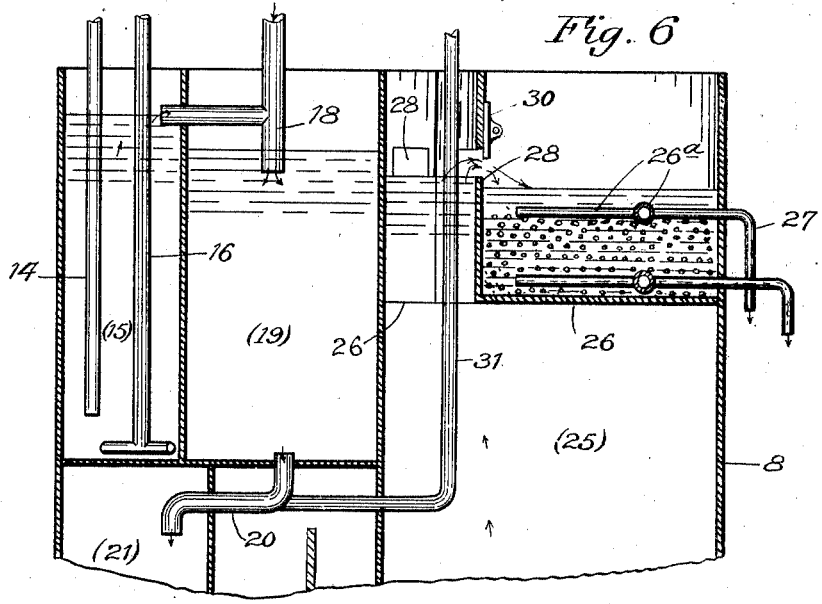
Figure 6 is a sketch showing a section of the tank with a modified position of the filter.
Figure 7:
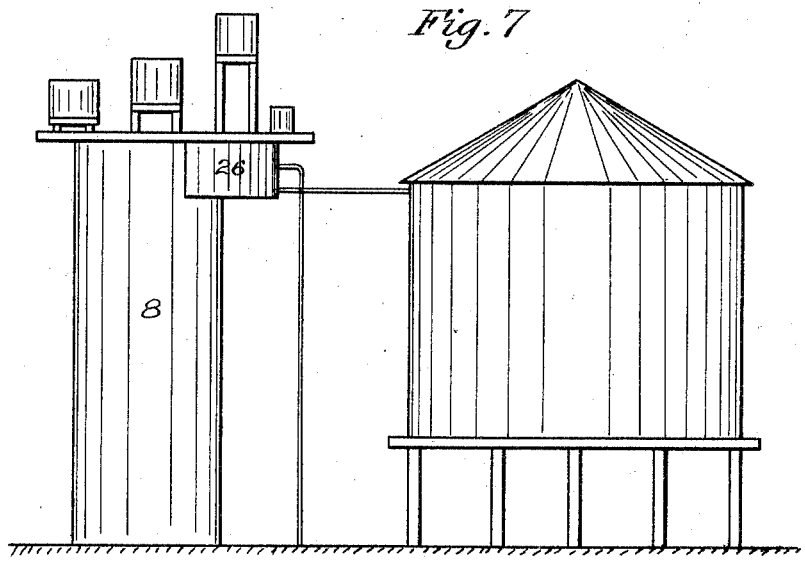
Figure 7 is an outline sketch showing the mounting of the parts as commonly applied to water softening and purification to supply boilers for railway engines.

In Figure 6 I have indicated a modification in which the filter, or several filters 26, are entirely inclosed in the tank 8. They may run across, taking segments of space therein, or may be circular in form as in Figure 2, a single one running entirely around or several, each one partially around the inside of the tank 8, as may be more convenient. Otherwise, a series of filters may run entirely around on the outside, placed as in Figure 2.

It will be seen from Figure 1 that I have provided a float 29 which is connected to a cock on the pipe 10 so as to automatically maintain a fixed level in the settling tank and prevent overflow when the water is no longer drawn from the filter. The valve 43, operated by lever 40 and the float in the weir box 11 will cause flow of the soda solution only when the weir feeds and the apparatus is in operation. This is important since the soda is not of fixed and limited solution; for which reason, also, I provide means for regulating the degree of opening of valve 43 when the level rises in the weir box.

It will be evident from the drawings that in operation the milk of lime is fed downward into compartment 15 as desired and the lime water is thoroughly satuated and settled and clarified before it empties into the incoming stream of water at the pipe 18, this being a fixed solution. In the compartment 19 the water is given an inverse vertical flow so as to thoroughly commingle the elements without regard to the specific gravities of the several parts, so that there is a very intimate mixture of the lime hydrate with the hard water before the entry into the soda treating tank 21. It will also be seen that the water from the soda tank 32 is sent directly into the inflowing stream of water after treatment with the lime and here again the current is carried first downward and then several times in reverse vertical direction so as to thoroughly commingle the strata and allow of the settlement of sediment in the bottom to be drawn off through the pipes. I regard the separate and distinct treatment of the lime in one tank and the soda in another as important; and it will be seen that the water after final treatment is carried upward through a long distance before it reaches the overflow which feeds the filter 26. By this means I avoid any marked current in the settling tank and the remaining precipitate may be drawn off through the pipe 34 and all impurities possible to remove by chemicals are taken out before the entry of the water into the filter. By means of the governing valves as indicated the flow through the entire apparatus may be continuous, and is self-regulating.

Having thus described my invention and illustrated its use, what I claim as new, and desire to secure by Letters Patent, is the following:

1. In filtering apparatus a single tank containing a lime saturating tank, a lime treatment tank, a separate soda treatment tank, a settling tank, and a filter, substantially as described.

2. In water purifying apparatus the combination of a lime saturating tank, a lime treatment tank, and a precipitating tank, means to feed the lime water into the incoming stream of fresh water just at its entry to the treatment tank, and an independent tank for treatment by a second chemical.

3. In water purifying apparatus the combination of a lime saturating tank, a lime treatment tank, and a soda treatment tank, the soda treatment tank being below and entirely separate from the lime treatment tank, and both tanks being provided with means for causing an inverse vertical flow of the water therethrough.

4. In water purifying apparatus the combination in a single tank, of a lime treatment tank, means for introducing soda into the outflowing stream from the lime treatment tank, a soda treatment tank separate from the lime treatment tank, and a settling tank of greater height than either of the other two tanks, substantially as described.

5. In water purifying apparatus the combination in one inclosure of a lime treatment tank, a separate soda treatment tank, a settling tank, with means for causing inverse vertical flow in both the lime and the soda tank, and an attached filter fed by overflow over its side, substantially as described.

6. In water purifying apparatus the combination of a lime treatment tank having means for intimately mixing lime water with an incoming stream of water without contact with the air therein and causing inverse vertical flow through the lime treatment tank, and a soda treatment tank fed directly from the lime treatment tank having means to intermingle soda water directly at the outflow from the lime tank, said soda tank being provided with means for causing inverse vertical flow therethrough, substantially as described.

7. In water purifying apparatus a single tank 8 containing as separate compartments therein, the lime saturating tank, the lime treatment tank, the soda treatment tank, and the settling tank of greater height than the other tanks.

8. In water purifying apparatus the combination in a single tank 8 of the compartment for lime saturation, the compartment for lime treatment, the compartment for soda treatment, the settling tank and the filter, each of which compartments is separate from the rest, and each of which treatment tanks is fed with the chemical directly at the point of inflow of the water therein.

9. In water purifying apparatus a tank 8 containing lime treatment and soda tanks, a settling tank and a filter all inclosed in one, the filter being fed by overflow from the top of the settling tank, substantially as described.

10. In water purifying apparatus the combination in a single tank 8 of the various compartments for lime treatment and soda treatment and water settling, the settling tank being fed directly from the treatment tank and having an inclined bottom therein below the opening from the treatment tank, and having a filter at the top of the settling tank fed by overflow from said tank, substantially as described.

11. In continuous flow water purifying apparatus, the combination with a single tank containing the chemical reacting compartment, and an upward flow settling compartment, of a series of independent gravity filters carried on the top of the tank, fed by overflow from the settling compartment, and each having means for washing the filter and a valve to close communication with the settling compartment, whereby any one of said filters may be isolated and washed, while the flow continues through the others from said supporting tank.

12. In continuous flow purifying apparatus the combination with a tank comprising a chemical treatment compartment and a superposed and communicating settling compartment, of means to introduce the chemical below the settling compartment, means to introduce the water therein, and a regulable valve to govern the introduction of the chemical solution governed by a float in the supply tank for the whole system, whereby the water supply and chemical supply are simultaneously governed, and a float in the settling tank governing the water supply feed pipe.

In testimony whereof I have hereunder signed my name in the presence of the two subscribed witnesses.

JOHN C. W. GRETH.

Witnesses:
F. W. H. CLAY,
CHAS. H. EBERT.

DISCLAIMER.

775,901.—*John C. W. Greth*, Pittsburg, Pa. WATER-PURIFYING APPARATUS. Patent dated November 22, 1904. Disclaimer filed November 24, 1913, by the assignee, *William B. Scaife and Sons Company*.

Enters its disclaimer—

"To that part of the subject-matter covered by claim 10 of said patent, which is in the following words, to wit:

"In water purifying apparatus the combination in a single tank 8 of the various compartments for lime treatment and soda treatment and water settling, the settling tank being fed directly from the treatment tank and having an inclined bottom therein below the opening from the treatment tank, and having a filter at the top of the settling tank fed by overflow from said tank, substantially as described."

*Official Gazette, December 9, 1913.*